United States Patent
Saye et al.

(10) Patent No.: US 12,120,182 B2
(45) Date of Patent: Oct. 15, 2024

(54) SYSTEMS AND METHODS FOR MODULATING DATA OBJECTS TO EFFECT STATE CHANGES

(71) Applicant: Daily Rays Inc., Cave Creek, AZ (US)

(72) Inventors: Ashley Saye, Pacific Palisades, CA (US); Diego I. Medina-Bernal, Cave Creek, AZ (US); Jonathon Nostrant, Pacific Palisades, CA (US)

(73) Assignee: Daily Rays Inc., Cave Creek, AZ (US)

( * ) Notice: Subject to any disclaimer, the term of this patent is extended or adjusted under 35 U.S.C. 154(b) by 0 days.

(21) Appl. No.: 17/860,047

(22) Filed: Jul. 7, 2022

(65) Prior Publication Data

US 2023/0040444 A1 Feb. 9, 2023

Related U.S. Application Data

(60) Provisional application No. 63/218,927, filed on Jul. 7, 2021.

(51) Int. Cl.
*H04L 67/12* (2022.01)
(52) U.S. Cl.
CPC .................................. *H04L 67/12* (2013.01)
(58) Field of Classification Search
CPC .. G06Q 10/0639; G06K 9/00496; G06K 9/62; G06K 9/6293; H04L 67/12; H04L 67/306; H04L 67/535; H04L 67/303; G06F 18/254; G06F 17/16; G06F 16/24578; G06N 20/00; G06N 3/08
See application file for complete search history.

(56) References Cited

U.S. PATENT DOCUMENTS

| | | | |
|---|---|---|---|
| 9,710,757 B2* | 7/2017 | Gilon | G06N 99/00 |
| 10,223,459 B2* | 3/2019 | Liu | G06Q 30/0282 |
| 10,740,939 B1* | 8/2020 | Chung | G06V 10/82 |
| 2009/0276403 A1* | 11/2009 | Tamayo | G06F 16/2465 |
| 2013/0073280 A1* | 3/2013 | O'Neil | G06F 40/20 704/E11.001 |
| 2013/0275514 A1* | 10/2013 | Tanaka | H04L 67/535 709/204 |
| 2016/0029458 A1* | 1/2016 | Liu | H05B 47/16 700/32 |
| 2016/0232201 A1* | 8/2016 | Goran | G06F 16/24 |
| 2016/0259492 A1* | 9/2016 | Le | G06F 3/0487 |
| 2017/0123824 A1* | 5/2017 | Franck | G10L 17/02 |
| 2017/0206551 A1* | 7/2017 | Gupta | G06Q 30/0254 |

(Continued)

*Primary Examiner* — Tonia L Dollinger
*Assistant Examiner* — Linh T. Nguyen
(74) *Attorney, Agent, or Firm* — Marin Patents LLC; Gustavo Marin

(57) ABSTRACT

Systems and methods for modulating content to effect state change are described. A state control system initiates a process for modulating output objects to effect one or more changes in a state profile associated with a user device. The system queries for historical data associated with the user device; determines whether any historical data is identified for user device and in response to determining that historical data is found predicts a current state profile associated with the user device. The system further collects real-time sensor data associated with user device; filters and normalizes the sensor data; and delivers a plurality of output objects to the user device or secondary device(s) based on real-time sensor data.

3 Claims, 13 Drawing Sheets

(56) References Cited

U.S. PATENT DOCUMENTS

| | | | | |
|---|---|---|---|---|
| 2018/0285528 | A1* | 10/2018 | Healey | G06N 20/00 |
| 2018/0365384 | A1* | 12/2018 | Althoff | A61B 5/4815 |
| 2019/0197051 | A1* | 6/2019 | Hsu | G06F 16/48 |
| 2019/0354787 | A1* | 11/2019 | Fong | G06V 40/70 |
| 2020/0160384 | A1* | 5/2020 | Duncan | G06Q 30/0205 |
| 2020/0294670 | A1* | 9/2020 | Kotikela | G16H 50/30 |
| 2020/0302310 | A1* | 9/2020 | Woiceshyn | G06K 7/1413 |
| 2021/0306461 | A1* | 9/2021 | Scott | G06N 20/00 |
| 2021/0406218 | A1* | 12/2021 | Margolin | G06N 3/08 |
| 2022/0133194 | A1* | 5/2022 | Bach | A61B 5/6801 |
| | | | | 600/544 |
| 2022/0306143 | A1* | 9/2022 | Samani | B60W 50/14 |
| 2022/0327373 | A1* | 10/2022 | Chow | G06N 3/08 |
| 2022/0350846 | A1* | 11/2022 | Rezaeian | G06N 20/00 |
| 2022/0351021 | A1* | 11/2022 | Biswas | G06N 3/047 |
| 2022/0392625 | A1* | 12/2022 | Allen | G16H 20/30 |
| 2023/0009814 | A1* | 1/2023 | Hao | G06Q 30/0202 |

\* cited by examiner

SYSTEMS AND METHODS FOR MODULATING DATA OBJECTS TO EFFECT STATE CHANGES

CROSS-REFERENCE TO RELATED APPLICATIONS

This application claims the benefit of, and priority to U.S. provisional application 63/218,927 titled, "SYSTEMS AND METHODS FOR MODULATING DISPLAYED CONTENT TO EFFECT A CHANGE IN A MOOD STATE PROFILE BASED ON QUANTIFIED MOOD METADATA" filed on Jul. 7, 2021, the entire specification of which is incorporated herein by reference.

BACKGROUND OF THE INVENTION

Field of the Art

The disclosure relates to the field of generating and subsequently modulating a data object stream to facilitate an expected state profile associated with a user device.

Discussion of the State of the Art

Communication devices, such as mobile phones, smartwatches, tablets, and the like allow for users to interact with a multitude of information on a real-time or near real-time basis. For instance, smartphones have made it exceedingly easy to keep track of a user's biometric factors, financial information, personal and social data, etc. With this information there also arises a possibility of generating personalized content for the user by third parties with which the user may have agreed to share their data. However, the personalized data for the users of cellular devices or even computers, are still largely based on analyzing inherent data such as cookies, i.e., taking into account historical user data from websites, applications, social media, and the like, and generating advertisements of products, services, sales, etc. to be displayed at the user's device.

Further, even when these third-party service providers explicitly obtain user's personal information, as curated by the user themselves, the content recommendation is more often than not unidimensional and does not take in account changes in user parameters in short time periods.

What is needed in the art are systems and methods for curating and modulating data objects for user devices to account for state changes to achieve an expected state profile.

SUMMARY OF THE INVENTION

The inventor has conceived and reduced to practice, in a preferred embodiment of the invention, systems and methods for modulating data objects based on automated and learned state predictions.

According to a preferred embodiment of the invention, a system for modulating output objects for effecting state change, the system comprising: a network-connected state control computer comprising a memory and a processor and further comprising programmable instructions stored in the memory and operating on the processor, the instructions when executed by the processor, cause the processor to: initiate a process for modulating output objects to effect one or more changes in a state profile associated with a user device; query for historical data associated with the user device; determine whether any historical data is identified for user device; in response to a determination that the historical data is found for user device predict a current state profile associated with the user device; collect real-time sensor data associated with user device; filters and normalizes the sensor data; and deliver a plurality of output objects to the user device or secondary device(s) based on real-time sensor data.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

Figure 7A:
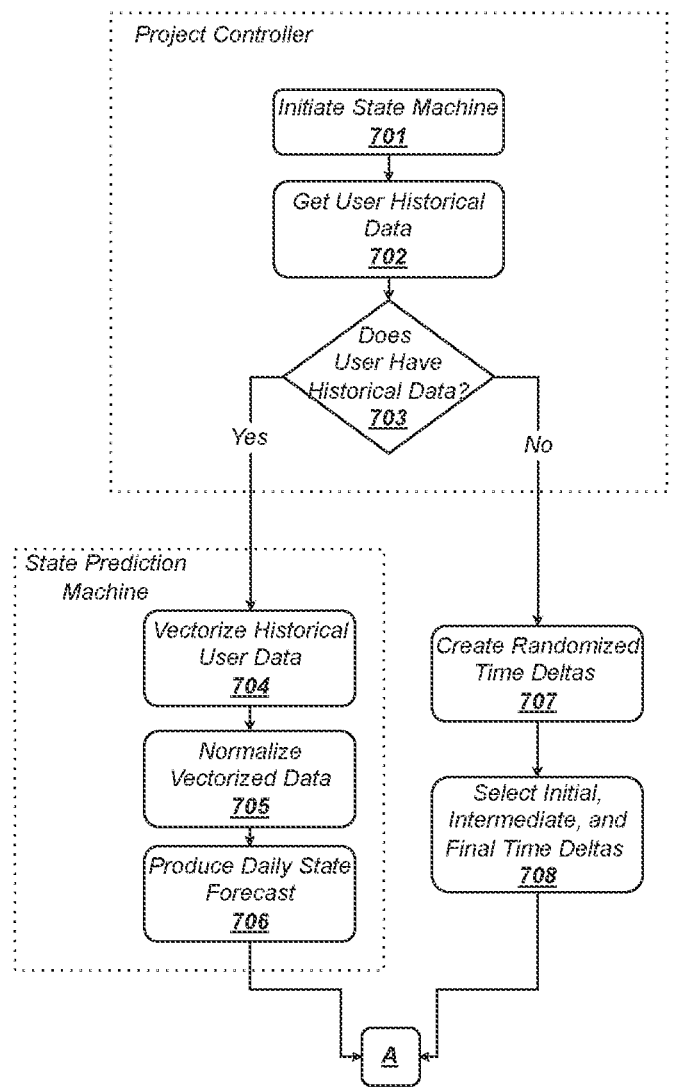
FIG. 7A is an exemplary flowchart illustrating a method for predicting state profile for a user device, according to a preferred embodiment of the present invention.
Figure 7B:
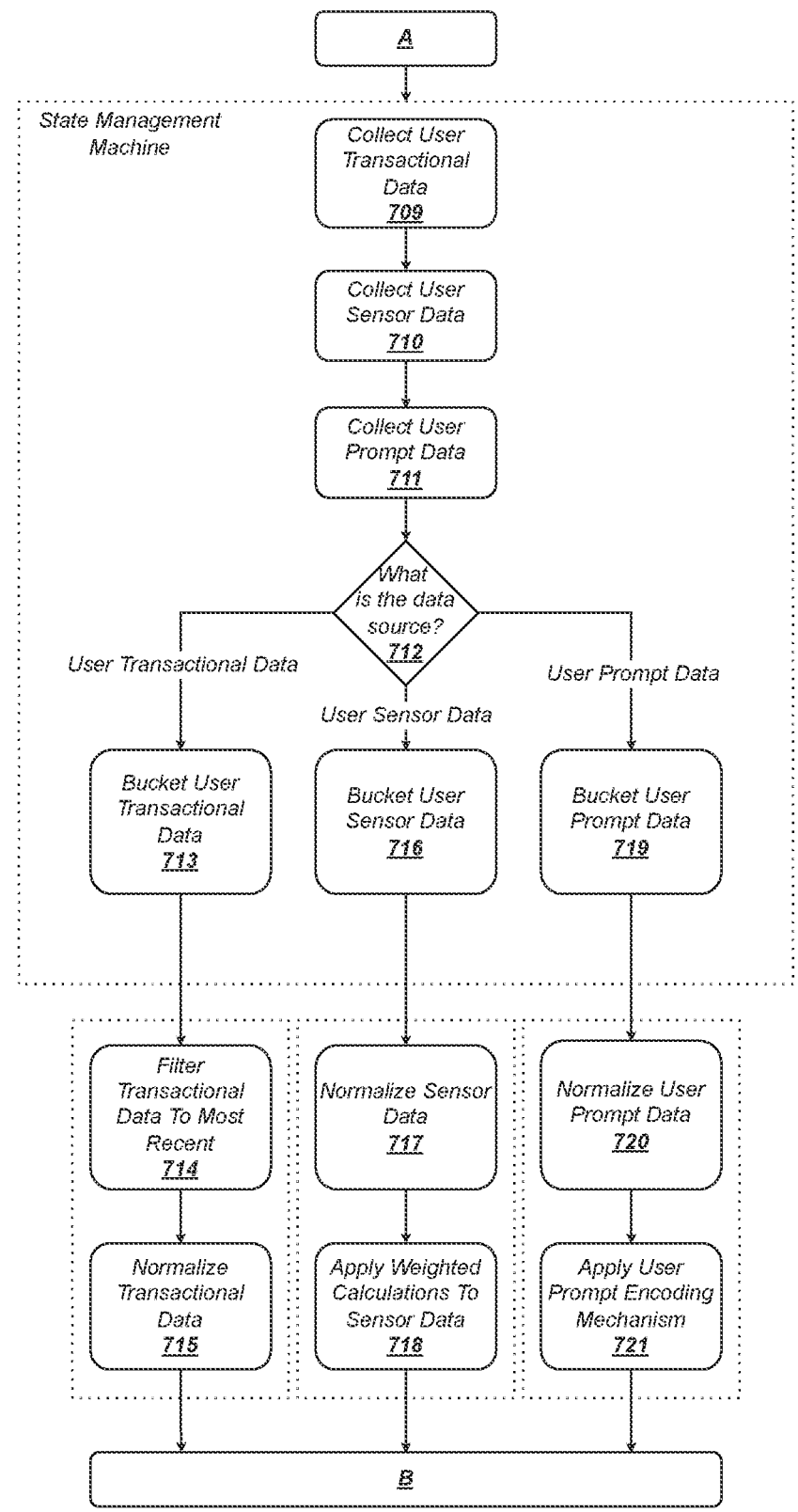
FIG. 7B is an exemplary flowchart illustrating a method for collating and bucketing user device data, according to a preferred embodiment of the present invention.
Figure 7C:
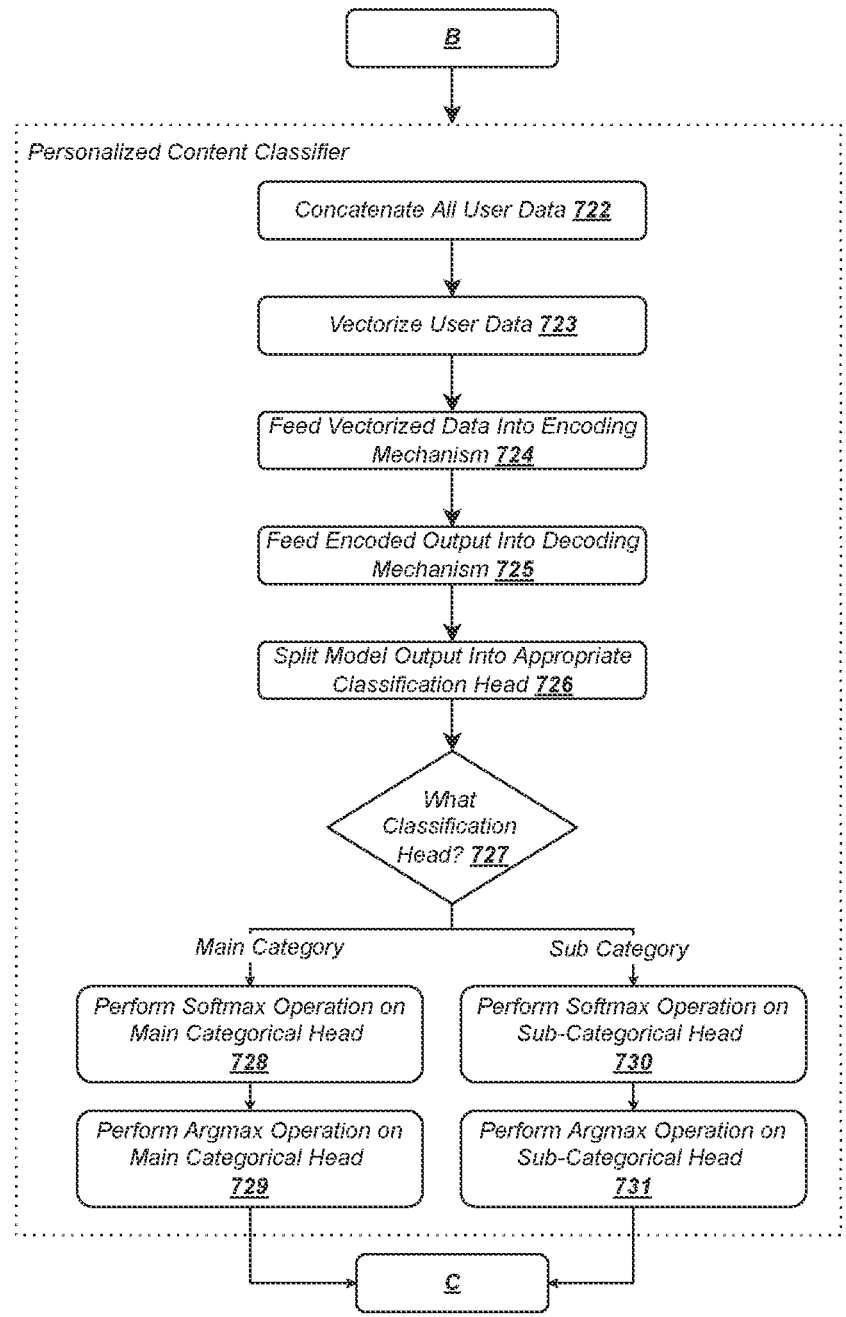
FIG. 7C is an exemplary flowchart illustrating a method for classification of output objects in one or more categories and sub-categories, according to a preferred embodiment of the present invention.
Figure 7D:
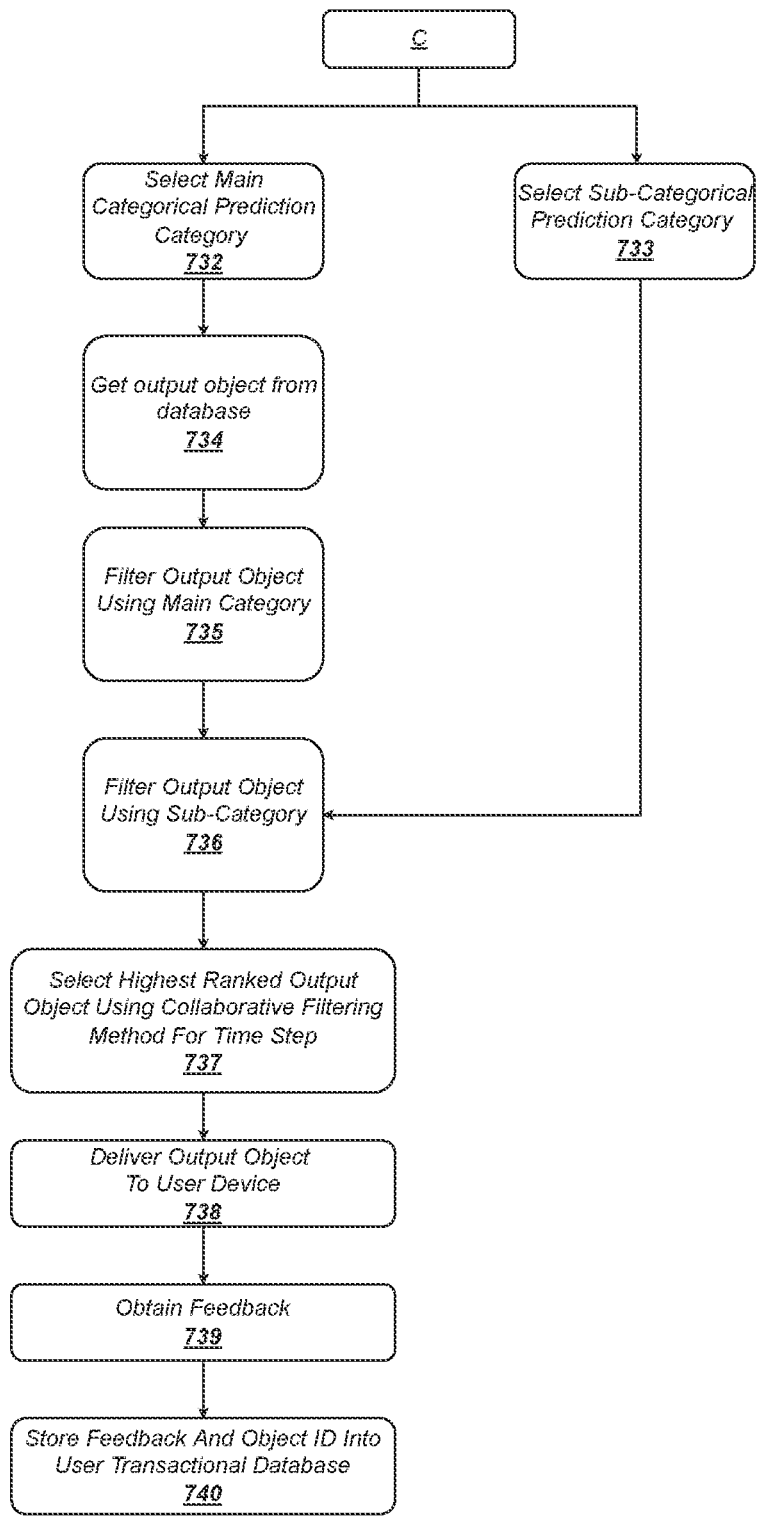

FIG. 7D in an exemplary flowchart illustrating a method for delivering output objects to one or more user devices, according to a preferred embodiment of the present invention.

Figure 8:
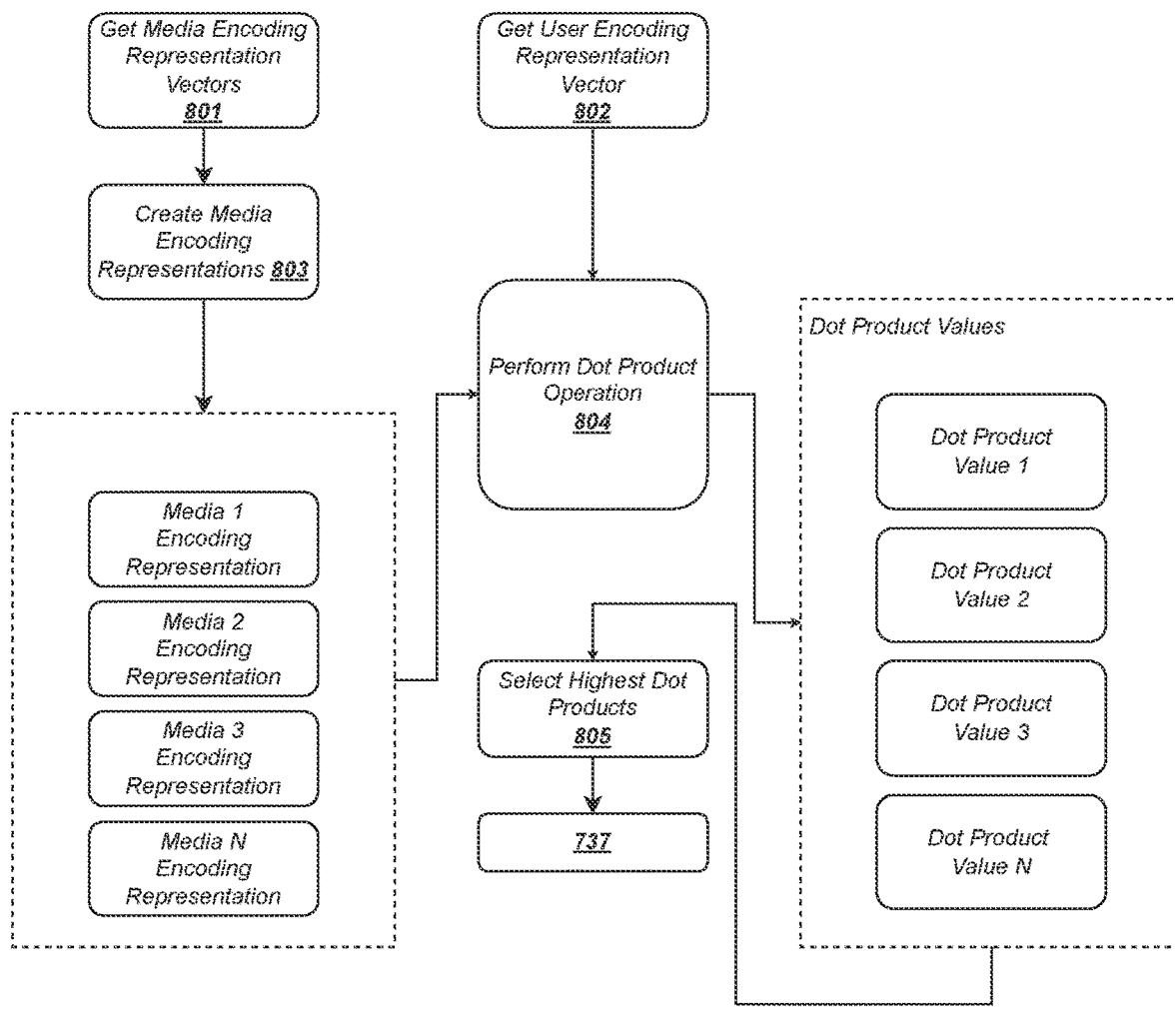

FIG. 8 is an exemplary flowchart illustrating a method for creating ranked lists for a plurality of output objects, according to a preferred embodiment of the present invention.

Figure 9:
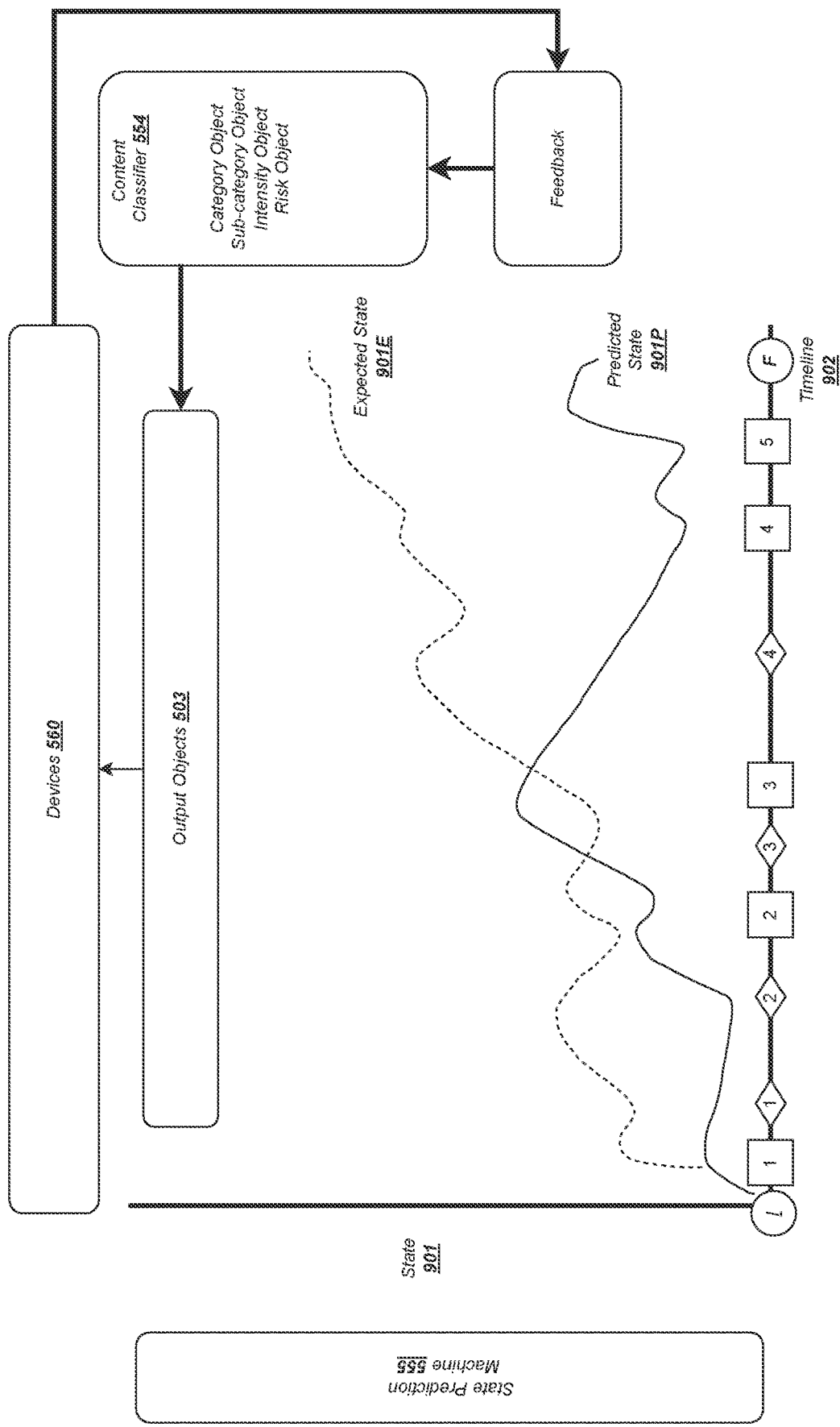

FIG. 9 is an exemplary timeline diagram illustrating a state prediction and state expectation cycle associated with a user device, according to a preferred embodiment of the present invention.

DETAILED DESCRIPTION

The inventor has conceived, and reduced to practice, systems and methods for generating and modulating data objects to affect state profiles associated with one or more user devices.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
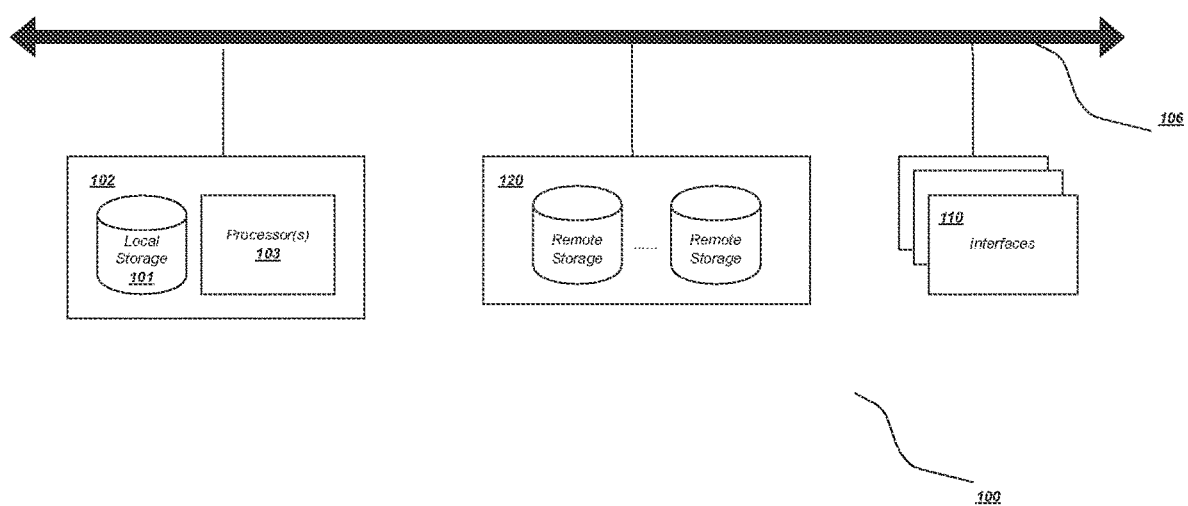
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
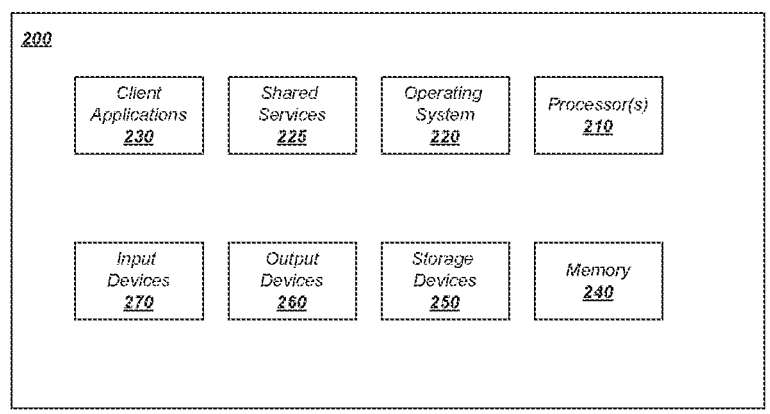
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

In some embodiments, systems of the present invention may be implemented on a distributed computing network, such as one having any number of clients and/or servers.

Figure 3:
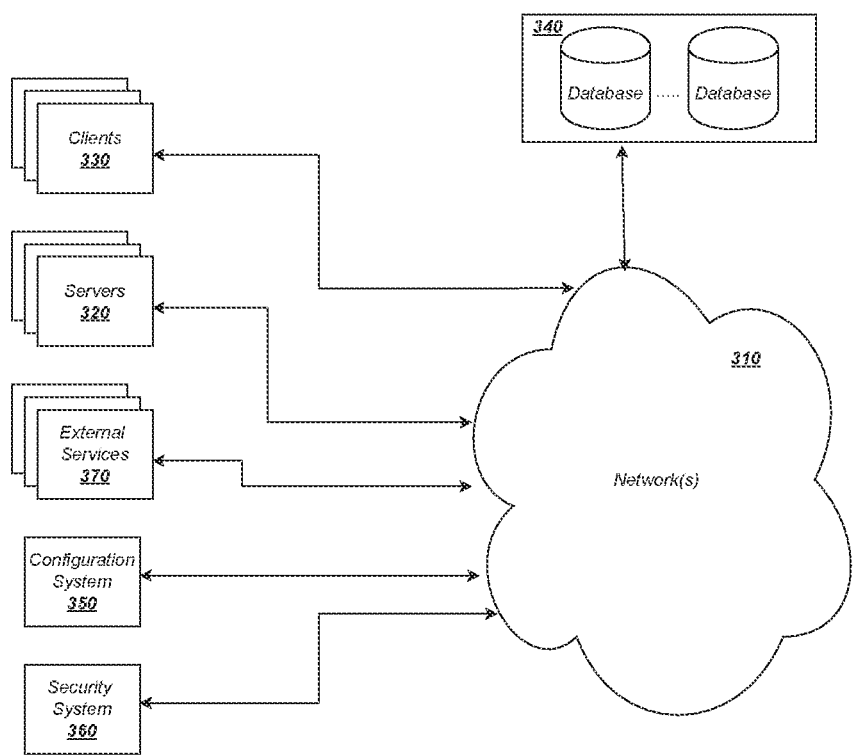
FIG. 3 is a block diagram showing an exemplary architectural arrangement of clients, servers, and external services, according to an embodiment of the invention.

Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
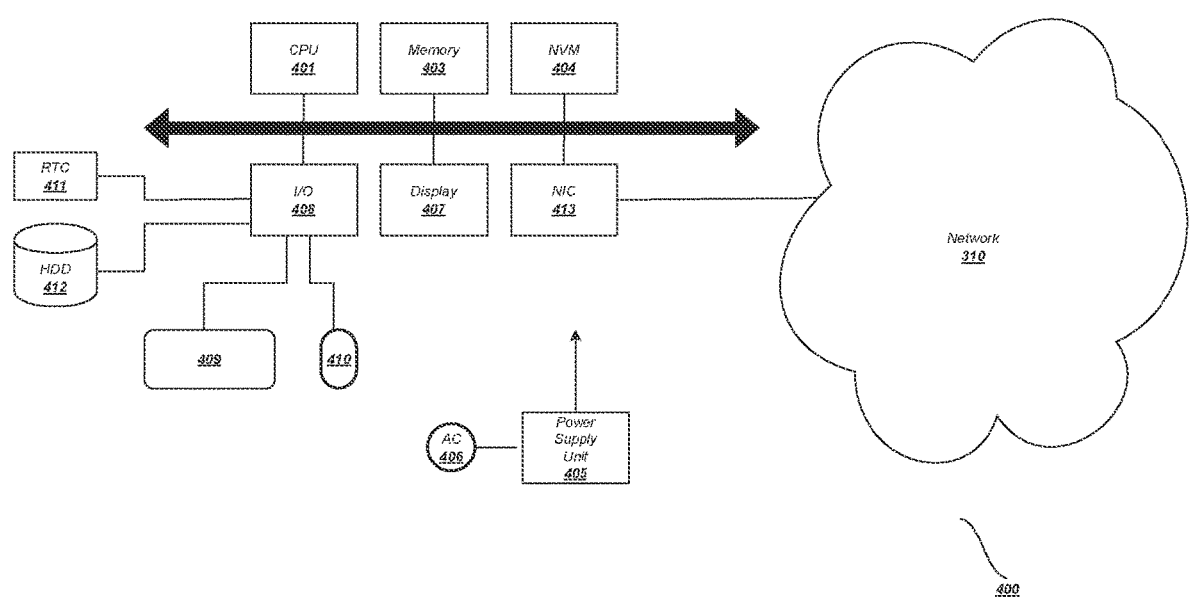
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5A:
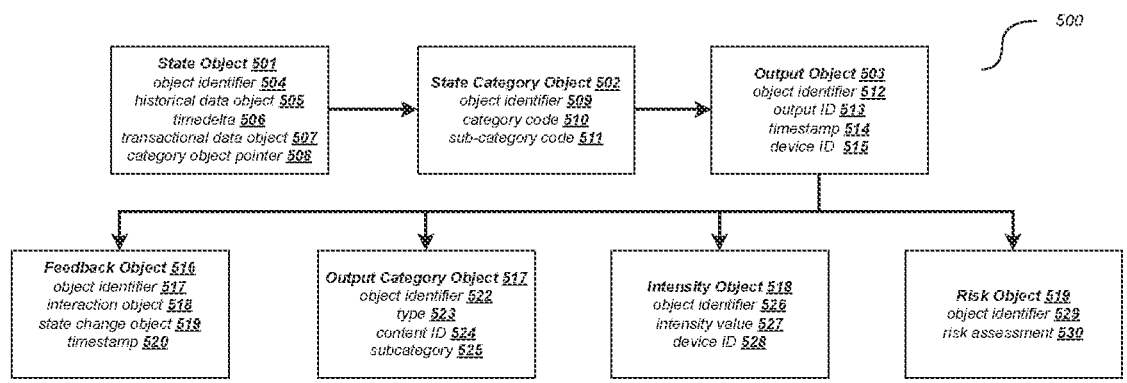
FIG. 5A is a block diagram illustrating a plurality of objects used for effecting changes in state profiles, according to a preferred embodiment of the invention.

FIG. 5A is a block diagram illustrating a plurality of objects used for effecting changes in state profiles, according to a preferred embodiment of the invention.

According to the embodiment, a plurality of programming instructions stored in memory 240 that when executed by at least one processor 210 comprise a plurality of objects that may comprise data, in the form of fields, often known as attributes and programming instructions, in the form of procedures, often known as methods. Objects 500 may be arranged such that procedures can access and often modify one or more data fields of an associated object. In various embodiments, programming instructions enable objects to interact with one another. In a preferred embodiment, objects 500 may be implemented in an object-relational database management system, for example, PostgreSQL and the like.

Accordingly, it can be appreciated that an understanding of a plurality of data objects created by a state control computer 540 (refer to FIG. 5B) provides a means for large scale involvement of users via devices 560 in a networked environment to participate in a quantitative fashion to evaluate data objects that require an understanding of interest regardless of device location, temporal displacement (i.e. when the data objects were received), psychology (willingness to provide responses in an open forum, or requirement for anonymity), and the like. An interest categorization may represent a collective understanding of what may be most important categories of state to at least one user associated to devices 560.

State object 501 may be a plurality of programming instructions stored in memory 240 that when executed by one or more processors 210 describe a prediction of a state of an owner associated with devices 560, in one example, as generated using state control system 540 (hereinafter interchangeably referred to as system 540) or directly received from an external service provider, including but not limiting to, a psychological evaluation record of the device owner, medical records associated with the device owner, financial portfolio associated with the device owner, and the like. In a preferred embodiment, state object 501 may comprise: an object identifier 504, whereby each instantiation of state object 501 may be referred to uniquely within the system 540; historical data object 505 that may be one or more data objects comprising historical state data or state profiles associated with the device owner; timedelta 506 comprising executable instructions to identify one or more timelines at which predictive state data for the device owner has been recorded; and one or more category object pointers 508 to one or more category objects 502.

Said differently, system 540 may configure multiple state objects 501 whereby each state object 501 may be associated to a plurality of other objects to enable analysis of state changes associated with an owner of device(s) 540. It should be appreciated that user devices 561 may be at least a portion of devices 540. In a preferred embodiment, user devices 561 may be devices that, through network 310, provided data objects, for example, historical data object 504 and/or transactional data object 507. In some embodiments, secondary devices 562 (referring to FIG. 5B) may be considered user devices 561 and vice-versa.

State category object 502 may be a plurality of programming instructions stored in memory 240 that when executed by processors 210 describe one or more categories and one or more sub-categories in which the state objects may be divided. State category object 502 may comprise: object identifier 509 which may be a globally unambiguous persistent identifier representing an instance of category object 502; category code 510 may be textual description of a category in which a given state object is classified into, e.g., each historical data object 505 comprised within state object 501 may be classified as associated with a given category such as psychological, financial, medical, social, and the like. State category object 502 may further comprise sub-category code 511 that may be unique identifier associated to one or more sub-categories that state objects 501 are classified into.

Output object 503 may be a plurality of programming instructions stored in memory 240 that when executed by processors 210 comprise an arrangement of information in the form of media and other content to be delivered to one or more devices 560. Output object 503 may comprise: object identifier 512 which may be a globally unambiguous persistent identifier representing an instance of output object 503; output ID 513 may be globally unambiguous persistent identifier representing a type of each output delivered to devices 560; timestamp 514 may be an arrangement of information corresponding to an output delivered to a device 560 and an associated time (e.g., date, day, time, etc.) at which said output was delivered; and device ID 515 indicative of an unambiguous identifier of a given device 560 to which one or more outputs are being delivered to. In a preferred embodiment, each output object 503 corresponds to feedback object 516, output category object 517, intensity object 518, and risk object 519.

Feedback object 516 may be a plurality of programming instructions stored in memory 240 that when executed by processors 210 relay feedback information received from one or more devices 560 describing change in state profile of an owner of a device 560 as realized by deliverance of output objects 503 to the device 560. Feedback object 516 may further comprise object identifier 517 that may be globally unambiguous persistent identifier representing a feedback object 516; interaction object 518 describing an interaction cycle of device 560 with a given output object 503; state change object 519 describing information about a change in a state profile of an owner of device 560 in response to an interaction of the device 560 with a given output object 503; and timestamp 520 describing a given point in time where device 560 interacted with output object 503.

Output category object 517 may be a plurality of programming instructions stored in memory 240 that when executed by processors 210 describe one or more categories and one or more subcategories 525 that an output object 503 is classified into. Output category object comprises object identifier 522 that may be an unambiguous persistent identifier each individual representation of output category object 517; type 523 indicative of a type of output object 503; content ID 524 is an unambiguous persistent identifier representing an output object 503 classified within a given category and a given sub-category 525.

Intensity object 518 may be a plurality of programming instructions stored in memory 240 that when executed by processors 210 describe a quantified information of an intensity of one or more output objects 503 as received at devices 560. Intensity object 518 may comprise object identifier 526 that may be globally unambiguous persistent identifier representing an intensity object 518; intensity value 527 indicative of quantified information of an intensity of output object 503 as perceived by a device 560; and device ID describing the device 560.

Risk object 519 comprises object identifier 529 that may be globally unambiguous persistent identifier representing a risk object 519; and risk assessment 530 describing one or more quantified risk factors based on perception of a given set of output objects 503 on devices 560 over a given period in time.

Figure 5B:
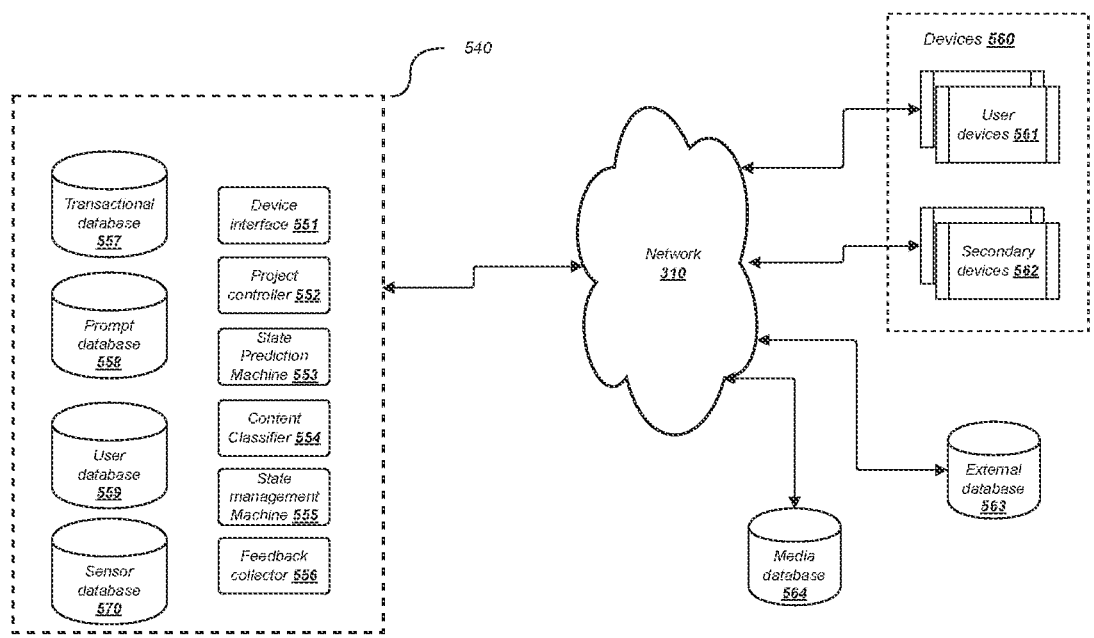
FIG. 5B is a block diagram illustrating an exemplary system for modulating output objects to effecting changes in state profiles, according to a preferred embodiment of the invention.

FIG. 5B is a block diagram illustrating an exemplary system for modulating output objects to effecting changes in state profiles, according to a preferred embodiment of the invention.

According to the embodiment, a state control computer 540 comprises a processor, a memory and a plurality of programming instructions. The state control computer 540 further comprises: device interface 551, project controller 552, state prediction machine 553, content classifier 554, state management machine 555, and feedback collector 556. In an embodiment, state control computer 540 may have access to one or more internal databases such as transactional database 557, prompt database 558, user database 559, and sensor database 570. The state control computer 540 may further communicate with one or more external databases such as external database 563 and media database 564 and devices 560.

Devices 560 may comprise user devices 561 comprising a user device such as a specially programmed mobile computer device, a smartphone, and the like; or secondary devices 562 comprising a user device such as a specially programmed mobile appliance device, smartwatches, IoT devices, smart bio-sensing rings, smart meditation headbands, other wearables, or other display devices (for example Amazon Echo™, Google Home™, and the like)

Detailed Description of Exemplary Embodiments

Figure 6:
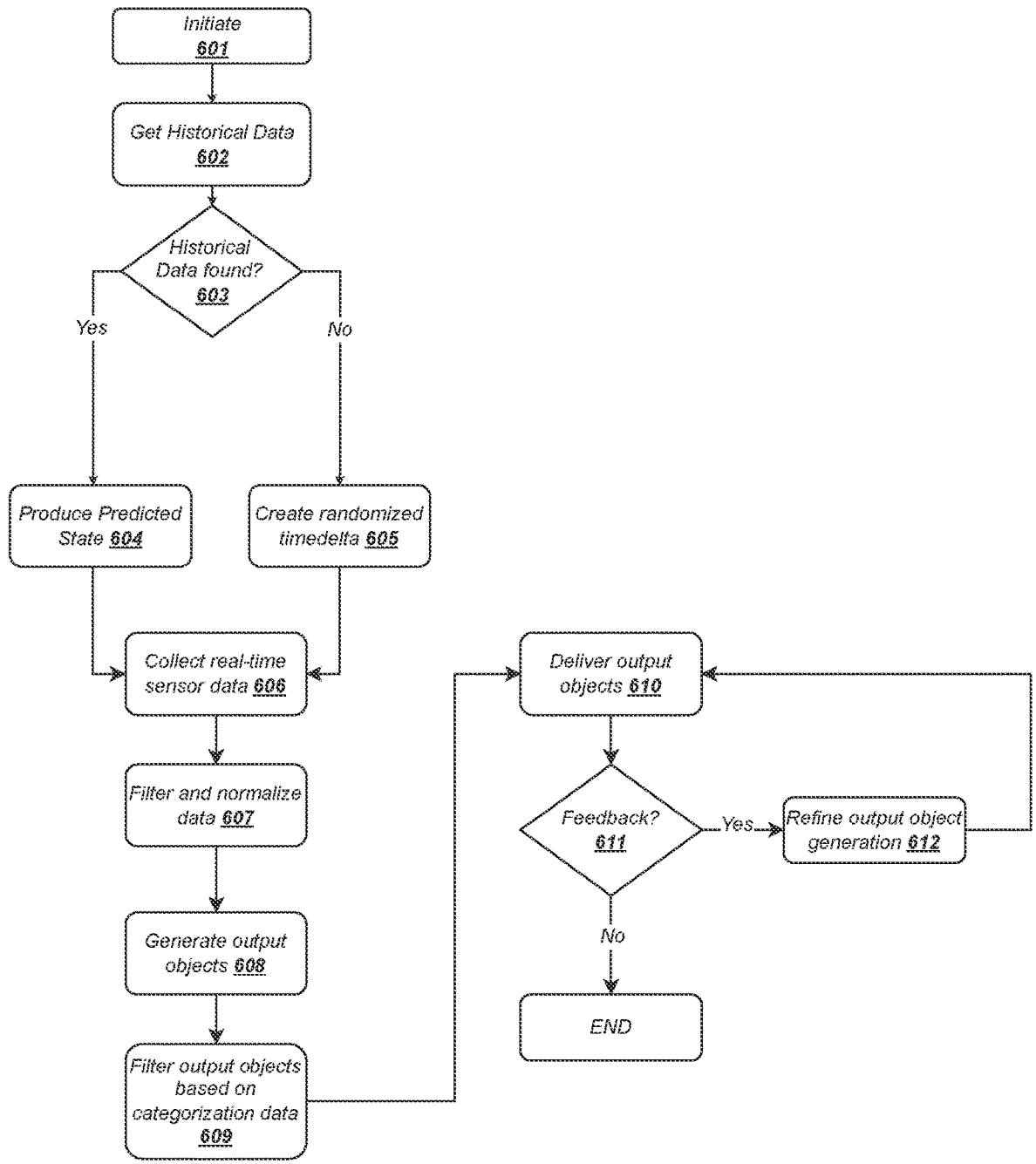
FIG. 6 is a block diagram illustrating an exemplary method for generating output objects to achieve an expected state profile, according to a preferred embodiment of the invention.

FIG. 6 is a block diagram illustrating an exemplary method for generating output objects to achieve an expected state profile, according to a preferred embodiment of the invention. According to the embodiment, the method may start at step 601 wherein state control computer 540 may initiate a process for modulating output objects 503 to effect one or more changes in a state profile associated with a given user device 561. In an implementation, during the initiation of the process, state control computer 540 may communicate with user device 561 to obtain information including but not limiting to a financial profile, a health profile, a psychological data, sensor data, application data, automatic speech recognition (ASR) data, social data, and the like associated with user device 561.

In a next step 602, project controller 552 may gather historical data for the user device 561. In an implementation, project controller 552 may gather historical data by pinging one or more external databases (such as external database 563) or by querying one or more internal databases such as user database 559. According to an embodiment, project controller 502 may gather historical data for user device 561 to produce a predicted state associated with a user of user device 561, based at least in part of previous interactions of state control computer 540 with user device 561 and/or secondary devices 562 associated with said user. The prediction of state is as described in subsequent description.

In a next step 603, project controller 552 may determine whether any historical data is identified for user device 561. In an implementation, the historical data for a given user device 561 may be identified by project controller 552 as historical data objects 505. Each historical data object 505 may be indicative of information accessible by state control computer 540 to predict a current state of user associated with user device 561 (identified within state objects 501, as described in the foregoing). If it is determined by project controller 552 that historical data is found for user device 561, in a next step 604, state prediction machine 553 may predict a current state of the user. In an embodiment, the current state of the user may be predicted by state prediction machine 553 based at least in part on information contained within historical data objects 505, as received from a given user device 561. In an exemplary implementation, said information may comprise user's psychological parameters, mood profile, medical profiles, financial information, social interactions, browsing data, and the like associated with user device 561 and may be received directly from one or more applications residing within user device 561. In another implementation, the above information may also be received from one or more third-party aggregator service providers.

Referring again to FIG. 6 step 603, if no historical information is found for user device 561 by project controller 552, in a next step 605, a randomized timedelta for user device 561 may be created by state prediction machine 553. In an implementation, the randomized timedelta may be created in order to create a predictive timeline for the state objects 501, e.g., time between when a user device 561 interacts with a first state object 501 and when the user device 561 interacts with a nth state object between a given range of time. Once the given range of time values are identified, state prediction machine 553 can create randomized time points where user device 561 interacts with state objects 501 (as described in detail in FIG. 9).

Once a predictive state associated with user device 561 is generated by state prediction machine 553 (either by using historical information or by using randomized timedeltas), in a next step 606, project controller 552 may collect real-time sensor data associated with user device 561. In an exemplary implementation, real time sensor data may include information such as biometric data, heart-rate sensor data, accelerometer data, pedometer data, glucose level data, speech data, and the like. In the implementation, the sensor data may be obtained from one or more sensors, including but not limiting to, biometric sensor, heart-rate monitors, pedometers, glucose monitors, and the like.

In a next step 607, state management machine 555 filters and normalizes the sensor data. The filtration and normalization of data by state management machine is described in detail with reference to FIG. 7B.

In a next step 609, content classifier 554 may filter a plurality of output objects 503 based on categorization data as extracted from output category objects 517. In an implementation, the categories may include video output, audio output, textual output, haptic output, and the like. Further, the categorization data may be different for different type of user devices 561 and/or secondary devices 562. Once the plurality of output objects 503 have been filtered and categorized, in a next step 610, project controller 552 may deliver the plurality of output objects to the user device 561 or secondary device(s) 562. In an implementation, the deliverance of the plurality of output objects 503 may at least be performed at given times, as deducted from timedelta 506 from state object. For instance, state control computer 540, in an example, may determine points in time when an interaction with user device 561 is ongoing, such that at each point in time delivery of an output object 561 can affect in change of a state profile associated with user device 561. That is, state control computer 540 can learn and then predict (through feedback received from user devices 560 and other means described in subsequent text), different time periods in a given timeline, where delivering a specific type and category of output objects 503 would cause change in a state profile associated with user device 561 from a recorded actual state to an expected state (as described in FIG. 9).

Further, in another embodiment, each time state control computer 540 interacts with user device 561 or secondary devices 562, state control computer 540 may perform one or more actions to realize the expected state profile. Apart from delivering output objects 503 at user device 561, state control computer 540 may further perform actions such as, interact with an IoT device associated with user device 561, refine parameters associated with predicted state profile associated with user device 561, change type of output objects 503 for future delivery of output objects 503, and the like.

Referring again to FIG. 6, in a next step 611, feedback collector 556 may determine whether any feedback is received from user device 561 for the plurality of output objects 503 delivered to user device 561. If no feedback is received by feedback collector 556, the method may end.

Otherwise, if feedback is received, in a next step 612, content classifier 554 may refine one or more of the plurality of output objects 503 (and/or generate different set of output objects 503) to be delivered to user device 561. In an embodiment, in refining the one or more output objects 503, content classifier 556 may perform one or more actions, including but not limiting to, selecting a different type of output object 503, modifying a time at which an output object 503 is scheduled to be delivered to user device 561, selecting output objects 503 to be sent to a different device(s) 560, selecting an output object 503 in a different category, and the like. Once the refinement of output objects 503 is performed, the method may continue to step 610, wherein the refined output objects 503 may be delivered to user device 561.

Turning now to FIG. 7A, an exemplary flowchart illustrating a method for predicting state profile for a user device is shown. In an embodiment, the method may begin at step 701 wherein project controller 552 may first initiate an execution cycle of state prediction machine 553. In an embodiment, the initiation of state prediction machine 553 may comprise but collecting user historical data (step 702) and activating state machine 553 in response to interaction of user device 561 with state control computer 540 (e.g., when user device 561 first "wakes up" and/or a user device 561 first registers with state control computer 540 using an application inherent to user device 561). Once user device 561 has an active communication channel with state control computer 540, state prediction machine 553 will become active.

In a next step 703, project controller 552 may determine whether user device 561 comprises any pre-recorder or historical data. In one embodiment, the historical data may be indicative of a predicted state profile associated with user device 561 (e.g., a psychological state of user device's owner), and may be included in one or more historical data objects 505 comprising data such as user's psychological parameters, mood profile, medical profiles, financial information, social interactions, browsing data, and the like associated with user device 561. In another implementation, the historical data may further include information pertaining to output objects 503 previously delivered to user device 561 and interaction of user device 561 with said previously delivered output objects 503.

If historical data is found by project controller 552, in a next step 704, state prediction machine 553 may vectorize identified historical data, as comprised within historical data objects 505. In an embodiment, historical data objects 505 may be vectorized by state prediction machine 553, by extracting historical data from historical data objects 505, and further formatting said the data into a vectorized format. This may include restructuring the data into a vector comprising of floating-point values.

In an exemplary implementation, state prediction machine 553 may serve a purpose of learning how a state profile associated with user 561 would change for a given timeline (e.g., over a 24-hour period). When historical data is identified, state prediction machine 553 may learn statistical patterns from said historical data. Such statistical patterns may include information such as times in the timeline when the state profile values are lowest and highest. Further, when observing a quantified schema of the state profile (as shown in FIG. 9), state prediction machine 553 may record one or more influenceable factors and one or more non-influenceable factors that may affect the state profile in the given timeline. In a preferred embodiment, using methods described herein state control computer 540 may learn to predict un-influenceable factors and when these occur in the timeline, to provide one or more output objects 503 accordingly, so as to facilitate a positive change in the state profile.

Referring again to FIG. 7A, state prediction machine 553, in a next step 705 may normalize the vectorized data. In an embodiment, normalizing the data by state prediction machine 553 may comprise normalizing the vectorized data into a range of 0 through 1. Typically, this data is normalized through a function such as min-max scaling or one or more more complex normalization methods resulting in a normalized vector with zero mean and unit variance.

In a next step 706, state prediction machine 553 may produce a daily state profile forecast, in one implementation, using a daily forecast model. In an embodiment, the daily state profile forecast may be created by state prediction machine 553 by feeding appropriately vectorized and normalized data through the daily state forecasting model that may be a sequential forecasting model such as a Recurrent-Neural-Network or any other variant. In the embodiment, the daily state profile forecast may be indicative of a prediction of a state profile, as it changes, through a 24-hour period. Other time-periods may be possible and are contemplated. The state profile changes, in one example, may represent how the state profile changes (e.g., how a mood of a user changes) during a given time period, at least based on previously recorded interaction of user device 561 with one or more output objects 503.

Referring again to step 703, if no historical data is found, in a next step 707, project controller 552 may create one or more randomized timedeltas. In an embodiment, the randomized timedeltas may be indicative of time periods in a given timeline where state control computer 540 may check for changes in state profiles. According to the embodiment, state control computer 540 may retrieve and measure state profile parameters at a chosen initial state, intermediate state, and final state (step 708). However, if a given user device 561 is communication with state control computer 540 for the first time, said timedeltas may be selected at random with the initial timedelta being selected when user device 561 establishes a connection with state control computer 540 and the final timedelta chosen when the user device 561 last interacts with the state control computer 540. The method may then continue to step 709 of FIG. 7B.

Turning now to FIG. 7B, an exemplary flowchart illustrating a method for collating and bucketing user device data is shown. According to an embodiment, the method may start at step 710, wherein after creating a state forecast (or selecting randomized timedeltas), state management machine 555 may collect user transactional data for user device 561. In one embodiment, user transactional data may be collected from user device 561 and stored as transactional data object 507 in transactional database 557. The user transactional data, in one exemplary implementation, may comprise interaction records of user device 561 pertaining to information of recorded interactions (such as interaction objects 511) of user device 561 with previously delivered output objects 503. For instance, such recorded interactions may include user device 503 interaction with videos, audios, textual media, and other media, when these are delivered to user device 561 by state control computer 540. The user transactional data may further comprise metadata associated with such recorded interactions, e.g., duration of interaction, completion status of interaction, discarded output objects 503, cancelled output objects 503, output objects 503 for which feedback is received, and the like.

In a next step 710, state management machine 555 may collect sensor data associated with user device 561. As described in the foregoing, the sensor data may include as biometric data, heart-rate sensor data, accelerometer data, pedometer data, glucose level data, speech data, financial data, social media data, other application data, and the like and may be stored at sensor database 570. Further, in next step 711, state management machine 555 may collect user prompt data and store the user prompt data to prompt database 558. User prompt data includes but is not limited to direct user device 561 interaction data from state control computer 540. Such as, any vocal or written conversations between user device 561 and state control computer 540 and/or direct video or image content accessed by user device 561 from state control computer 540.

Once all data is retrieved by state management machine 555, in a next step 712, state management machine 555 may determine data from which data source is currently analyzed. If state management machine 555 determines that user transactional data is being currently analyzed, in a next step 714, content classifier 554 may filter transactional data to most recent. In an implementation, the user transactional data may be filtered for a predefined time period (e.g., timeline) and each transactional data object 507 in the predefined time period may be sorted in a descending order (i.e., starting with the most recent transactional object 507).

In a next step 715, state management machine 555 may normalize the transactional data. In an implementation, the filtered transactional data may be normalized by state management machine 555 into floating point numbers with zero mean and unit variance.

Referring again to step 712, if it is determined by state management machine 555 that the data to be further analyzed is sensor data, in a next step 716, state management machine 555 may bucket sensor data. In an implementation, the sensor data may be collected at each given time in a timeline and bucketed into an appropriate format and data object. In a next step 717, sensor data may be normalized by state management machine 555. In an embodiment, the sensor data may be normalized by state management machine 555 into floating point numbers with zero mean and unit variance. Further, in a next step 718, state management machine 555 may apply one or more weighted calculations to the normalized sensor data. In an implementation, applying the weighted calculations may include performing a matrix multiplication of an equally shaped matrix. This equally shaped matrix is a weighted feature list formatted through a given pre-defined template, obtained either from user device 561 or created internally by state control computer 540.

Referring again to step 712, if it is determined by state management machine 555 that the data to be further analyzed is user prompt data, in a next step 719, state management machine 555 may bucket the user prompt data. Similar to sensor data, user prompt data may be collected at each given time in a timeline and bucketed into an appropriate format and data object. In a next step 720, state management machine 555 may normalize the bucketed user prompt data. In an implementation, the prompt data may be normalized by state management machine 555 by transforming any natural text formatted data into tokenized inputs, or transforming any image content into normalized values with zero mean and unit variance.

In a next step 721, state management machine 555 may apply an encoding mechanism to the normalized user prompt data. In an implementation, this encoding mechanism may be responsible for feature extraction and latent feature representation based on type of user prompt data. The encoding mechanism, in one implementation, includes but is not limited to utilizing Convolutional-Neural-Networks for image data to Transformer-Based-Networks for natural language data. Typically, each neural networks-encoder output is used as the encoder output representation for this step. The method may then continue to step 722 of FIG. 7C.

Turning now to FIG. 7C, an exemplary flowchart illustrating a method for classification of output objects in one or more categories and sub-categories is disclosed. According to an embodiment, the method may start at step 722, wherein content classifier 554 may concatenate all user device 561 data. In an embodiment, each of the user transactional data, sensor data, and user prompt data may be concatenated into a single data object (e.g., state category object 502).

In a next step 723, content classifier 554 may vectorize all concatenated user data. In an implementation, content classifier 554 may vectorize user data into a vector format and into a tensor data object. Further, in a next step 724, content classifier 554 may feed the vectorized user data into an encoding mechanism. In an embodiment, content classifier 554 may utilize an encoding layer which takes in raw high-dimensional user data and transforms such user data into a lower-dimensional representation vector. Further, the encoding mechanism can further include using embedding weighted layers or other encoding mechanisms such as those found in transformer-encoders as seen in natural language processing tasks.

In a next step 725, content classifier 554 may feed encoded user data into a decoding mechanism. In an implementation, content classifier 554 may feed the output of the encoding mechanism (i.e., a lower-dimensional representation vector) through a decoding mechanism that may include linear to non-linear transformation or another decoding mechanism, e.g., as seen in transformer-decoder architectures.

In a next step 726, a model output (i.e., data output after the encoding and decoding mechanisms) may be split by content classifier 554 into appropriate classification heads. In an embodiment, the classification heads may include a main category classification and a sub-category classification. In an implementation, content classification may utilize a model comprising a single linear transformation with a number of nodes equaling to a sum of main-categories and sub-categories. In the embodiment, each split node may represent a weighted output for that specific category. This combined output may then be split by content classifier 554 through vector slicing, such that the main-category slice is of index 0 to n, where n is the number of main categories, and the sub-category slice is of index n to −1, where −1 represents the end of the vector grabbing the last index value.

In a next step 727, content classifier 554 may determine which classification head is being analyzed. When data pertaining to main categories is being analyzed, in a next step 728, content classifier 554 may perform a SoftMax operation on the main categorical head. In an implementation, this SoftMax operation will push down all lower weighted outputs closer to 0, while pushing the highest value closer to 1. The total vector sum should be equal to 1.

In a next step 729, content classifier 554 may perform an argmax operation on the main categorical head. In an implementation, the argmax operation grabs the node's index with the highest value. This index is used to represent the main-category that is predicted by the model used by content classifier 554. The method may then continue to step 732 of FIG. 7D.

Referring again to step 727, if data pertaining to subcategories is being analyzed, in a next step 730, content classifier 554 may perform a SoftMax operation on the sub-categorical head. In an implementation, this SoftMax operation will push down all lower weighted outputs closer to 0, while pushing the highest value closer to 1. The total vector sum should be equal to 1. Further, in a next step 731, content classifier 554 may perform an argmax operation on the sub-categorical head. In an implementation, the argmax operation grabs the node's index with the highest value. This index is used to represent the sub-category that is predicted by the model used by content classifier 554. In an embodiment, each of the processed main category and sub category vectors may be stored within category code 510 and sub-category code 511, respectively. The method may then continue to step 732 of FIG. 7D.

Turning now to FIG. 7D, an exemplary flowchart illustrating a method for delivering output objects to one or more user devices is shown. The method may begin at step 732, wherein content classifier 554 may select a main category (from category code 510). In a next step 733, content classifier may select a subcategory (from subcategory 511).

In a next step 734, one or more output objects 503 may be selected from media database 564. As described in the foregoing, output objects 503 may comprise video output, audio output, textual output, speech output, haptic output, etc. In a next step 735, the one or more output objects 503 may be filtered by content classifier 554 using the category code 510. In an implementation, to filter the one or more output objects, content classifier 554 may retrieve a list of output objects 503 that are labeled with a given main category as extracted from category code 510. Further, in a next step 736, the list of output objects 503 may be further filtered by content classifier 554 using the subcategory code 511. In one example, main categories may include classifications such as finance, health, social, personal, etc. Further, a sub-category of output object 503 may comprise video, audio, text, haptic, and the like. Other main and subcategories are contemplated and are within the scope of this disclosure.

Further, in next step 737, a highest ranked output object 503 may be selected by content classifier 554 using a collaborative filtering method for time steps. The selection of highest ranked output object 503 is described in conjunction with FIG. 8. In a next step 738, the highest ranked output object 503 is delivered to user devices 561 (and/or secondary devices 562). In next step 739, feedback may be obtained from user device 561 about the delivered output object 503. In case a feedback is obtained, content classifier 554 may store said feedback and object ID 512 of output object 503 in transactional database 557. In an embodiment, the stored feedback allows this algorithm to learn through multiple learnable sub-components.

FIG. 8 is an exemplary flowchart illustrating a method for creating ranked lists for a plurality of output objects, according to a preferred embodiment of the present invention.

The method may begin at step 801, wherein content classifier 554 may obtain media encoding representation vectors. In an implementation, each output object 503 may contain metadata. In an example, part of this metadata may be a latent representation vector known as an encoding representation vector. This encoding is may be learned through user device's provided feedback over time, and is typically provided to the collaborative filter model.

In a next step 802, content classifier 554 may obtain user device encoding representation vector. In an embodiment, similar to output object 503 containing latent representation learned through a given model, user device 561 may also comprise a latent representation stored in transactional database 557. This latent representation also known as the User Encoding Representation Vector which can over time learn types of output objects that user devices 561 prefer.

In a next step 803, content classifier 554 may create one or more media encoding representations for each output object 503 using the media encoding vectors. In an implementation, the Media Encoding Representations may include a list of encoding representations obtained from a two-filter classification system. This list is an encoding as a matrix (Media Encoding Representation Matrix) of two dimensions, typically n for the number of output objects 503 in the list and m for the latent representation dimension.

Once content classifier 554 has the User Encoding Representation Vector and Media Encoding Representation Matrix, in a next step 804, content classifier 554 may perform a dot-product operation. In an implementation, the dot product operation may allow for finding the best output object 503 to deliver, where a higher dot product in this case equates to a higher satisfactory predictive ranking. If the dot product is positive, it may mean that the user device 561 prefers the delivered output object 503, otherwise, a negative value may represent discarding of output object 503 by user device 561. That is, a highest dot products may represent an output object 503 that user device 561 prefers the most. In an implementation, the calculated dot product values may cumulate to a single vector where each value indicates the dot-product value of that output object 503.

In a next step 805, an output object 503 with highest dot-product value is selected and the method may then continue to step 737 of FIG. 7D, wherein content classifier delivers the output object 503 to user device 561.

FIG. 9 is an exemplary timeline diagram illustrating a state prediction and state expectation cycle associated with a user device, according to a preferred embodiment of the present invention.

As depicted in FIG. 9, a graph between state profile associated with user device 561 ("state 901") and timeline 902 is plotted. In an implementation, state control computer 540 may utilize systems and methods disclosed hereinabove to facilitate changing of state profile from predicted state 901P to an expected state 901E. As shown in the Figure, state prediction machine 555 may generate a predicted state profile associated with a given user device 561 (shown by the solid line) on different time steps of timeline 902.

In an embodiment, an initial time step I and final time step F, may be randomized by state prediction machine 555 as a range of time for which the predicted state 901P needs to be improved to reach the expected state 901E. Further, at different time steps between I and F, one or more uninfluenceable factors (depicted by diamonds 1-4) may be realized that may affect the predicted state 901P. In an implementation, these uninfluenceable factors may be beyond a control of state control computer 540 and may end up positively or negatively affecting the predicted state as shown by the solid line.

In order to reach the expected state 901E, content classifier may push one or more output objects 503 at different time steps (shown as squares 1-5), to positively influence change of predicted state 901P to expected state 901E before or at the final time step F. In an implementation, time-based deliverance of such output objects 503, may be collectively referred to as influenceable factors that may be controller by state control computer 540, such that at each time-step wherein an output object 503 is delivered to user device 561, the predicted state 901P moves towards the expected state 903. However, there may be instances wherein deliverance of output objects 503 may negatively affect the state profile (i.e., the expected state 901E may be lower to the predicted state 901P at one or more timesteps). In such situations, state control system 540 not only autonomously learns the cause, but also rectifies the same by modulating the output objects based on previously received user feedback. Further, each output object 503 may further be analyzed by state control computer 540 using one or more of risk objects 519 and intensity objects 518. In an embodiment, for each main category and subcategory output object, content classifier 544 may run process as described in the foregoing to analyze a negative impact of a given output object 503 on state profile associated user device 561 (in addition to the feedback obtained from user device 561). These and other methods described herein may therefore result in an actual state profile improving to an expected state profile, thereby creating an arrangement wherein an owner of the user device 561 has an improved physiological and mental state throughout a given period of time.

The skilled person will be aware of a range of possible modifications of the various embodiments described above. Accordingly, the present invention is defined by the claims and their equivalents, according to a preferred embodiment of the invention.

What is claimed is:

1. A system for modulating output objects for effecting state change, the system comprising:
   a network-connected state control computer comprising a memory and a processor and further comprising programmable instructions stored in the memory and operating on the processor, the instructions when executed by the processor, cause the processor to:
   receive user data indicative of a current state of a user associated with a user device, wherein the user data comprises real-time sensor data, historical data, user interaction data, and transactional data associated with the user device over a timeline wherein the timeline represents a difference between a predicted state and an expected state;
   identify a plurality of output objects for delivery to the user device, the plurality of output objects collectively representing influenceable factors to affect a change a state of the user between the predicted state and the expected state over the timeline;
   rank the plurality of output objects, wherein to rank the plurality of output objects, the programmable instructions when further executed by the processor cause the processor to:
      create a user encoding representation vector and media encoding representation matrix for each output object of the plurality of output objects;
      perform a dot-product operation, the dot product operation operable to identify a best output object wherein a higher dot-product equates to a higher satisfactory predictive ranking; and
      wherein upon the dot-product operation being positive, the user device allows a receipt of the first output object, otherwise, the user device discards the first output object;
   identify a plurality of points in time in the timeline wherein each point in time of the plurality of points in time represent a time to deliver an output object of the plurality of output objects to affect the change of a state of the user;

identify at least one category and sub-category associated with the plurality of output objects based on the user data;

select a first output object of the plurality of output objects for the user device from the at least one category and sub-category, wherein the selected object is a highest ranked output object designed to bring a change in the current state of the user;

deliver the first output object to the user device at a first point in time of the plurality of points in time, wherein the output object comprises text, an audio file, a video file, or haptic output;

receive feedback from the user device, wherein the feedback is received in response to the delivered selected output object; and responsive to receiving feedback, predict a different plurality of points in time in the timeline for delivering other output objects of the plurality of output objects from the at least one category and sub-category.

2. The system of claim 1, wherein the network-connected state control computer is in communication with the user device and iteratively receives feedback from the users at multiple intervals, wherein the feedback is associated with the delivered output objects.

3. The system of claim 1, wherein to the plurality of instructions when executed by the processor, further cause the processor to:

encode the user data into a lower-dimensional representation vectors, wherein the user data is encoded after normalization of the received user data into vectors; and decode the lower-dimensional representation vectors using pre-trained models to identify at least one category and sub-category for the received user data.

* * * * *